March 10, 1931. T. ROWLANDS 1,795,681
PROCESS AND APPARATUS FOR THE TREATMENT OF METALLIC
ORES OR OTHER METALLIC PRODUCTS
Filed Jan. 21, 1928 7 Sheets-Sheet 1

March 10, 1931.  T. ROWLANDS  1,795,681
PROCESS AND APPARATUS FOR THE TREATMENT OF METALLIC
ORES OR OTHER METALLIC PRODUCTS
Filed Jan. 21, 1928   7 Sheets-Sheet 3

March 10, 1931. T. ROWLANDS 1,795,681
PROCESS AND APPARATUS FOR THE TREATMENT OF METALLIC
ORES OR OTHER METALLIC PRODUCTS
Filed Jan. 21, 1928 7 Sheets-Sheet 5

Inventor
Thomas Rowlands
by Cushman Bryant & Darby
Attys

March 10, 1931.  T. ROWLANDS  1,795,681
PROCESS AND APPARATUS FOR THE TREATMENT OF METALLIC
ORES OR OTHER METALLIC PRODUCTS
Filed Jan. 21, 1928  7 Sheets-Sheet 7

Patented Mar. 10, 1931

1,795,681

UNITED STATES PATENT OFFICE

THOMAS ROWLANDS, OF SHEFFIELD, ENGLAND

PROCESS AND APPARATUS FOR THE TREATMENT OF METALLIC ORES OR OTHER METALLIC PRODUCTS

Application filed January 21, 1928, Serial No. 248,517, and in Great Britain February 10, 1927.

This invention relates to processes for the treatment of metallic ores or other metallic products and in particular to processes of the kind in which metals, especially iron, are reduced directly from their ores or other compounds without fusion and with the production of granular metallic or other reduced products.

The invention has for its main object to modify and effect improvements in processes of the kind referred to with the view particularly of conserving and utilizing heat values throughout the operation of the process in the most economical manner and at the same time obtaining useful by-products some of which may be utilized in carrying out the process.

For this purpose according to the present invention a process for the reduction of ores or other metallic products without melting them consists in subjecting coal or other carbonaceous fuel to a low temperature carbonization, reducing the ore or other product by heating it with solid carbon or partly degasified fuel and reducing gases obtained from the low temperature carbonization treatment of the fuel, converting the carbon-dioxide or a large proportion thereof produced as a result of the reduction reaction into carbon-monoxide for re-use in the process, and utilizing sensible heat of products such as the reduced ore and gases obtained at various stages in the course of the operation of the process for effecting the low temperature carbonization of the fuel.

Sensible heat of gaseous products produced in the course of the operation of the process is also preferably utilized in the heating of the mixture of ore and fuel.

Preferably the gaseous products obtained from the low temperature carbonization operation are treated for the recovery of valuable by-products therefrom before using them as reducing agents.

The present process is particularly applicable to the reduction of iron ore to iron granules, the sensible heat of the reduced iron with or without that of the gaseous products obtained in the course of the operation of the process being used in effecting the low temperature carbonization of coal; the sensible heat of the aforesaid gaseous products, if a sufficient supply thereof be available, may also be used for preheating materials such as ores and fuel used in the process. The carbon-dioxide in the gases leaving the reduction zone is largely reconverted into carbon-monoxide which is preferably employed in heating the mixture of iron ore and reduction material and in aiding in the reduction operation.

The reduction of the iron from its ore is intended to be effected at a comparatively low temperature, for example, 500° C. to 950° C. by contact with carbonaceous material, for example, partially degasified coal, and with gaseous products resulting from the distillation of coal, and also with gases in which carbon-monoxide has been reformed, the iron being reduced to a granular form at temperatures far below melting or sintering temperatures, a temperature of about 700° C.–800° C. being regarded as particularly favourable when the reducing gases are comparatively rich in carbon-monoxide and poor in hydrogen.

In order that the said invention may be clearly understood and readily carried into effect the same will be more fully described with reference to the accompanying drawings, in which:—

Figures 1a and 1b illustrate in sectional elevation of a diagrammatic character the left-hand and right-hand parts respectively of a general arrangement of apparatus suitable for carrying out the process according to the present invention.

Figure 3 is a section on the line 3—3 of Figure 1a.

Figure 5 is a sectional detail view showing the construction at the end of the cooling chamber and the entrance to the coal distillation retort located therein—the left-hand end of the apparatus shown in Figure 1a.

Figure 7 is a section on the line 7—7 of Figure 5.

Figure 9 is a section on the line 9—9 of Figure 1a.

Figure 11 is a part section on the line 11—11 of Figure 9.

Figure 12 is an elevational view looking in the direction of the arrow B in Figure 9.

Figure 13 is an underneath plan view of a detail looking in the direction of the arrow C in Figure 9.

Figures 2 to 14 of the drawings are drawn on an enlarged scale with regard to Figures 1a and 1b, the scale of enlargement however not being the same for each figure.

The reduction of the ore or other material to be treated is effected by passing it together with the reducing material such as fuel through a rotating chamber or series of chambers 1, 2, 3 arranged horizontally or nearly so, the materials in the said chambers being indicated at 4, 5, 6. The ore is fed into the preheating chamber 1 by the following arrangement. The fine or crushed and dried ore is conveyed by any suitable means to the hopper or other container 7 (Figure 1b). Its passage from this hopper is controlled by a valve placed at 8 which may be opened and closed by means controlled by, or in conjunction with, the rotation of the chamber similar to those described hereinafter with reference to Figure 8. From the control valve 8 the ore passes down the shoot 9 which is built in through a non-rotating end section 10. The end of the duct 9 projects inwards into the preheating chamber 1 so that the ore descending it is deposited in the chamber approximately at 11. The sealing of the joint between the rotating preheating chamber 1 and the non-rotating end section 10 is effected by means similar to that described hereinafter with reference to Figure 2.

The crushed and/or dried and/or calcined and/or preheated ore descends the shoot 9 (Figure 2) by which it is carried forward into the rotating chamber 1, and deposited at 11. The shoot 9 is built into the non-rotating end section 10, through which the exit 12 for used gases is also built. An expansion joint with seal is formed between the wall 1¹ of the rotating chamber 1 and the non-rotating section 10. As illustrated the seal may be formed by a ring 13, which may be of rectangular section. A ring 14 of channel section is attached to the wall 1¹ of the rotating chamber 1 and a ring 15 is attached to the non-rotating section 10. The ring 13 makes contact with both the rings 14 and 15 thus sealing the joint. The ring 13 is retained in its place by springs 16 on screws 17 and is adjusted by nuts 18; springs 16 bear upon lugs 19 attached to ring 13. The ore passes into a section of the rotating chamber 1, where it is heated by gases from the chamber 2 derived partly from the fuel supplied at another part of the apparatus, and partly as a by-product of the reduction. In this chamber or section 1 the ore may be partially reduced by the reducing gases present whilst its temperature is rising. From this chamber or section 1 it passes forward to another rotating chamber or section 2 where its temperature is further raised and where it is mixed with fuel, which may be coal or other fuel which has been largely freed from its volatile constituents. Gaseous products from the distillation of coal or other fuel are fed into this section which may be heated by hot gases passing through the longitudinal passages 20 formed in the walls of the chamber 2; these gases are also permitted to flow through and over the mass of the charge by arrangements to be subsequently described, such gas subsequently mixing with the other gases in the reducing chamber 2. The gas supplied to the aforesaid passages 20 may in part be spent or partially spent gas drawn from another part of the apparatus. The spent gases before use for this purpose are preferably subjected to a reviving treatment so as to increase the proportion of carbon-monoxide therein at the expense of the carbon-dioxide—they may also if necessary be subjected to a re-heating treatment in recuperators or regenerators. Considering the case of the treatment of iron ore, the reduction in the reducing chamber 2 occurs partly by the action of hydrogen, if present, upon iron oxide, but to a more important extent by the action of carbon-monoxide upon iron oxide in the presence of carbon, and the temperatures of working are regulated so as to correspond to such reduction by carbon-monoxide and carbon. The reduced iron passes to the next rotating chamber or section 3 where its temperature gradually falls. It is still in contact with reducing gas and usually with some excess carbon. In cooling, its sensible heat is utilized to assist in the distillation of the coal or other fuel. The temperature of the reduced iron may in this way be lowered whilst it travels forward to such extent that when ultimately it is discharged there is no longer any possibility of its oxidation, but should this not be the case the final cooling of the reduced iron is effected outside the rotary chamber 3 and the heat so yielded up by the iron in cooling is economically utilized elsewhere as desired. The product may finally be magnetically separated in the usual way.

Figure 1A:
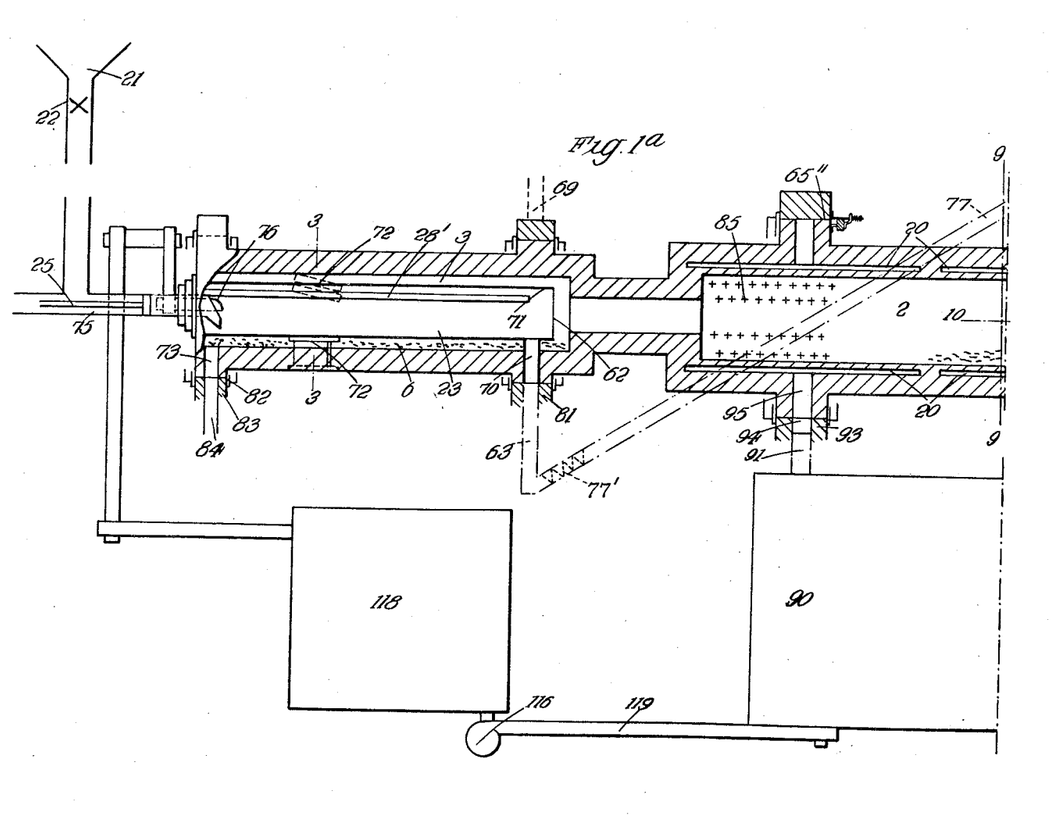
Figure 2:
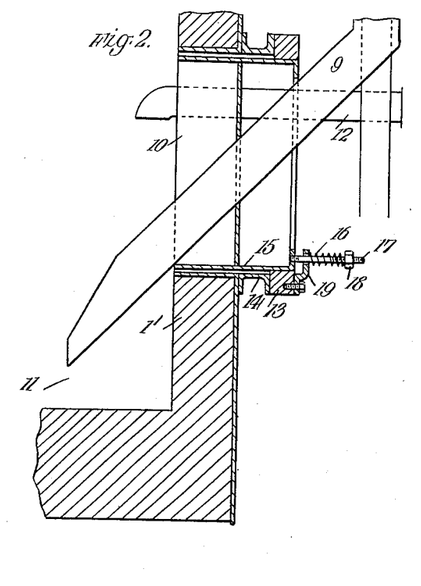
Figure 2 is a detail view showing the construction at the end of the preheating chamber—the right-hand end of the apparatus shown in Figure 1b.
Figure 3:
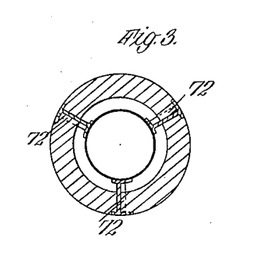
Figure 4:
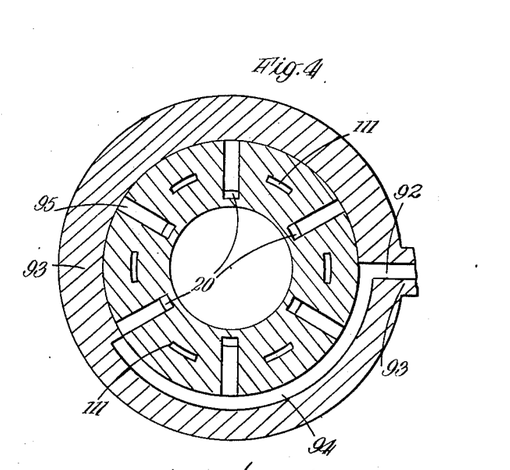
Figure 4 is a section on the line 4—4 of Figure 1b.

When coal is used as the fuel it should be preferably of the non-coking character and it should be dried, and crushed if not already sufficiently small; and if desired it may be pre-heated by gases drawn from another stage of the process. The coal is conveyed by suitable means to the hopper or container 21 (Figure 1a). This is provided with a valve or control 22, which may be opened and closed by or in relation with the rotation of the chamber by means similar to those hereinafter described in reference to Figure 8. From this control 22 the coal is passed into the retort 23 through a passage 24 (Figures 5 and 6) which may be provided with a pusher 25, or other conveyor; it is thus deposited in the retort 23, at 26. The passage 24 is constructed in a non-rotating end section 27. The gas exit pipe 28 is also built through the non-rotating section 27. The retort 23 rotates with respect to the non-rotating section 27 and the joint between them is made gas-tight by the following means. A sealing ring 29 makes contact with the interior of the cylindrical mouth of the retort at 30, and with the end face 31 of the non-rotating section 27. Springs 32 press the sealing ring into contact with the end section by means of lugs 33 and they are adjusted by screws 34 and nuts 35. The sealing ring may be provided with packing material 36 adjusted by a covering 37 and screws 38. The end section 27 may have a groove or grooves 39 in which there may be packing material (which may be soft material, rings or other known means of packing.)

Figures 5, 7, 11:
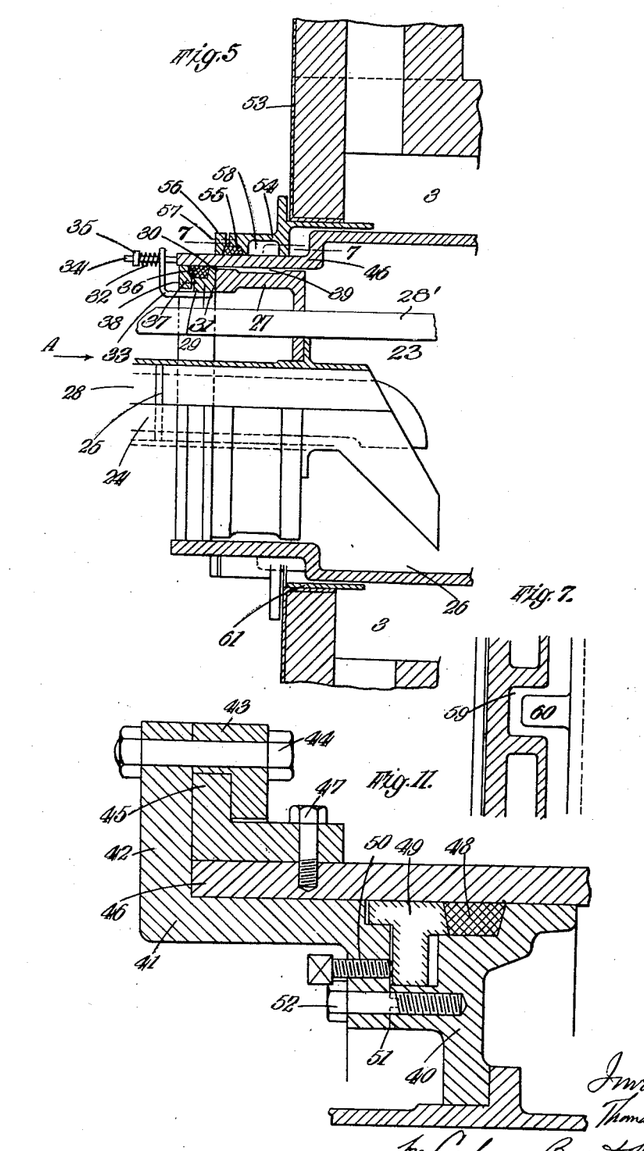
Figure 6:
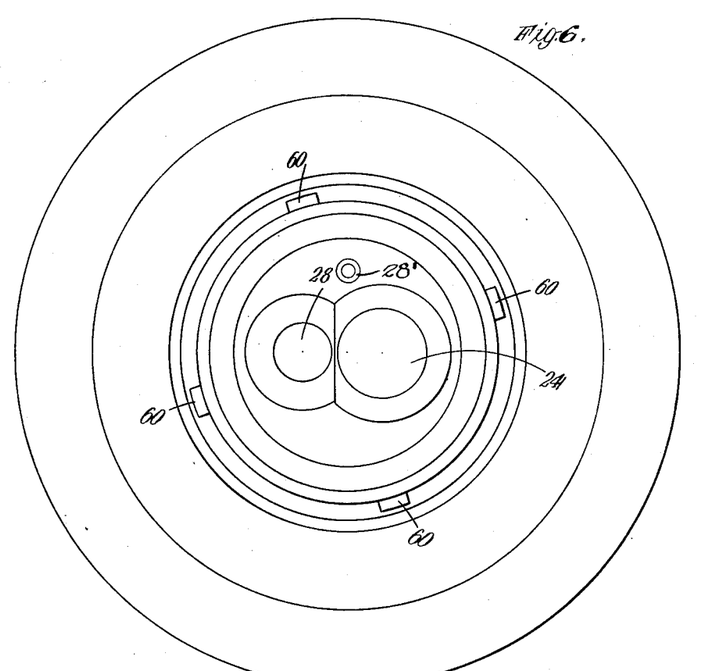
Figure 6 is an end view of Figure 5 looking in the direction of the arrow A.

The retort 23 rotates with the cooling chamber 3, but relative movement of expansion of the two may be provided for by an expansion joint of the kind shown in Figure 5. Attached to the casing end 53 of the cooling chamber 3, is a ring 54 which makes contact with the outside of the cylindrical end part 46 of the retort 23. The ring 54 may be provided with a packing 55 which may be adjusted by a ring 56 and screws 57. Such packing may be soft, or in the form of rings, or of other known form. There may be a groove or grooves 58 in the ring 54. There may be recesses 59 formed in the groove 58, which are also shown in the sectional plan in Figure 7. Projections 60 upon the retort 23 engage in the recesses 59, ensuring the simultaneous rotation of the retort and the cooling chamber. The ring 54 may have a spigot 61 fitting loosely for some distance over the retort.

Besides the coal conduit there may be provided a pipe 28' by means of which gases may be passed into the retort; such gases may comprise or include steam, or gases from another part of the apparatus, for example the reducing section 2 or the preheating section 1. The pipe 28' for introduction of gas may extend to near the end 62 of the retort 23. Gas may also if desired be passed into the retort 23 by introducing it through the fuel conduit 63 through which the degasified fuel is discharged. Gas may be withdrawn from the reducing or preheating sections of the apparatus by the means described hereafter in reference to Figure 8 (where 66 indicates the gas inlet or exit conduit) and passed into the fuel conduit 63. Intervening dust depositing chambers as indicated at 67 and 68 (Figure 1a) may also be provided.

Gas may be withdrawn from the retort 23 through the conduit 69 by means similar to that hereinafter described for the withdrawal of gas in reference to Figure 8. Usually however if gas be passed into the retort 23 the gases would be withdrawn from the opposite end of the retort through the exit pipe 28, (see Figures 5 and 6).

When gas is passed into the retort 23 it may be heated, for example, by recuperation, before passing it into the retort. The retort 23 is supported by brackets, arms or spiders 72. These may be of such a form that they tend to propel the charge in the desired direction. For example, they may be vanes which have an approximately helical form, so that as the chamber rotates the vanes tend to pick up the charge 6 which falls partly over the retort 23 and partly in the forward direction, that is, towards the end of the retort where the outlet 73 is located. The retort 23 is anchored to the cooling chamber 3 near to the fuel discharge conduit 70. At the other supports there is freedom for relative endwise movement. The arms or spiders shown at 72 are attached to the cooling chamber.

The coal or other fuel in the retort 23 is heated by the sensible heat of the product which is cooling whilst passing from the reduction chamber 2 to the discharge outlet 73 of the chamber 3. For this purpose the retort 23 in which this operation upon the coal or other fuel is performed is placed inside the chamber 3 and rotates with it. The fuel is charged into the retort through a duct 75 which passes through the end section, which is preferably non-rotating, in the manner previously described in detail in reference to Figure 5. The gaseous products of distillation of the fuel from which by-products are to be recovered are discharged through a pipe 76 which also passes through the end section. Usually it is preferred to treat the gases produced in the retort 23 for the recovery of valuable by-products therefrom before using the gas in other parts of the plant and for this purpose a gas-stripper is indicated at 118.

The duct 70, provided for the passage from the retort 23 of the solid fuel from which the volatile constituents have been more or less removed, extends from the retort through the wall of the cooling chamber 3 and discharges the fuel into a stationary duct 63, a continuation of which is constituted by the conduit 77 which latter may be provided with a worm or other conveyor 77' to convey the fuel to a duct 78 formed in the non-rotating section 79, whence it is carried into a duct or ducts 80, formed in the contacting part of the chamber 2, and then drops into the interior of the rotating chamber 2, which constitutes the reduction section of the apparatus.

A detailed description of the means for effecting the introduction of solids into the rotary chambers is given hereinafter in reference to Figure 8.

The partly degasified coal or other fuel is removed from the retort chamber 23 by the following means (see Figures 1a and 1b). The retort 23 is attached to and rotates with the cooling chamber 3 within which it is placed. Near its inner end an exit 70 for the degasified coal is formed. This consists of a passage from the retort extending through the wall of the cooling chamber to a surface 81, upon a non-rotating section in the lower part of which is formed a port or passage 63 with which the aforesaid passage 70 and the rotating section register at each revolution, thus allowing the solid material to fall into the passage in the non-rotating section which conducts it to the conveyor 77' in the conduit 77 for passing it forward to the reduction section 2 or elsewhere. The joint between the non-rotating and the rotating part may be sealed by means similar to those hereinbefore described.

A means by which the finished charge can be withdrawn from the cooling chamber 3 shown in Figure 1a is as follows:—At or near the discharge end of the cooling chamber 3 an exit passage 73 is formed through the wall of the rotating vessel leading to a surface 82 which rotates nearly in contact with a corresponding surface formed upon a non-rotating section 83. In the lower part of the non-rotating section a passage 84 is formed into which, at each revolution of the rotating chamber, solids fall, whence they are conducted away. The expansion joint 82 between the fixed and the rotating sections may be made gas-tight by means similar to those already described.

The treatment chambers 1, 2, 3 may be modified to a certain extent in their arrangement and form in order to deal with special circumstances as they arise, which may for example be of a local character, or to deal with raw materials of a particular kind.

The products of distillation from the retort 23 are usually treated for the recovery of by-products in the gas-stripper 118, leaving a gas which is usually comparatively rich in carbon-monoxide and low in hydrogen compounds and impurities, all or part of which may be passed by way of the pipe 119 and the main 91 into the reduction chamber 2 near the end 85 where the reduced products are discharged therefrom into the cooling chamber 3 in such a manner that their sensible heat is conserved. The gas then passes along the reduction chamber 2 in the opposite direction to that in which the ore and reduced iron traverse it, and performs the functions already mentioned, whilst an additional reducing agent is provided by the fuel (from which volatile products have been, to a greater or lesser degree, removed) and which is led by the passage 80, formed at the wall of the revolving reduction chamber 2, to a point near the reduction zone proper where it enters into, and becomes mixed with, iron ore which is in course of being reduced.

Figure 14:
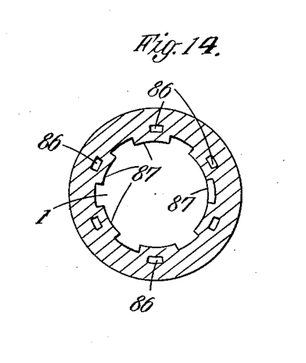
Figure 14 is a cross section of a form of ore preheating chamber of alternative construction to that shown in Figures 1a and 1b.
Figure 16:
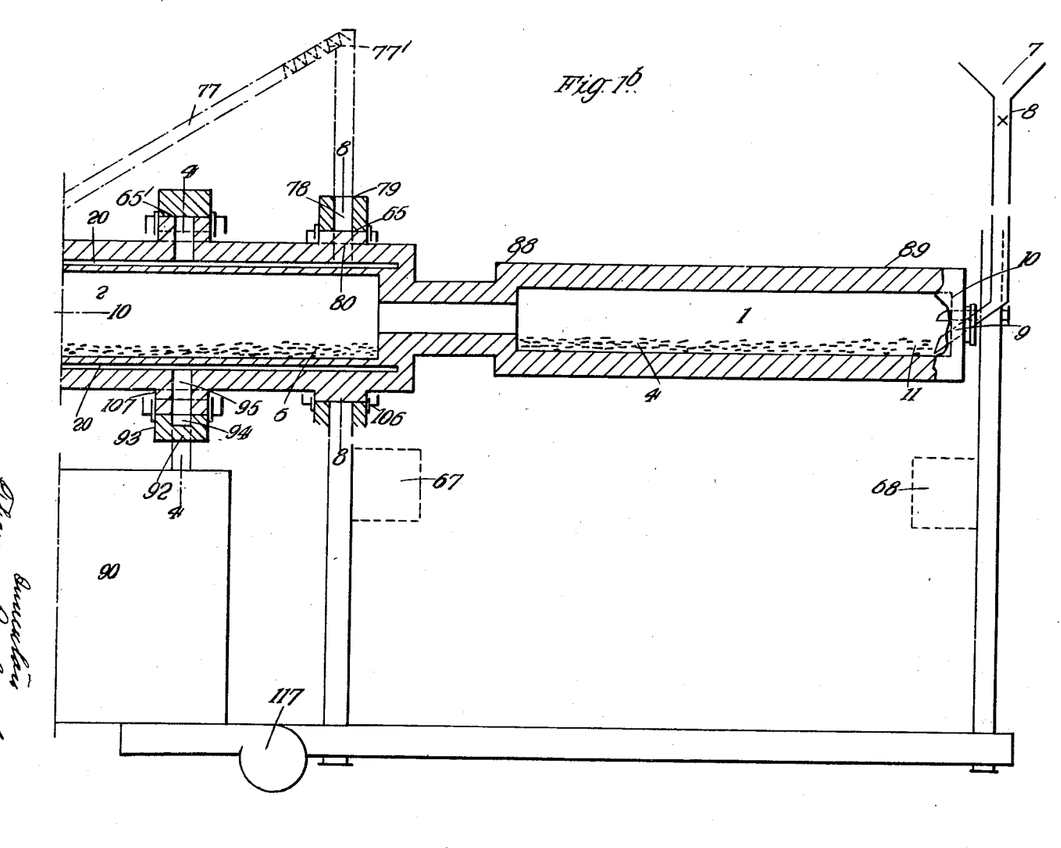

After passage of the gases through the reduction zone in which they tend to become converted to carbon-dioxide, but are reformed to carbon-monoxide in the presence of excess carbon, they may wholly, or in part, pass into the further section 1, the preheating section of the revolving chamber into which the iron ore is entering, upon which they may have a partial reducing action. Here any considerable excess carbon is usually absent, though it may be, but usually is not, introduced, and the gases become impoverished, with the result that there is an increase of carbon-dioxide content. The sensible heat of the gases is also lowered, being used in the heating of the ore. This section 1 may also, like the reduction section proper 2, be provided with a heating jacket or belt to which gas from another part of the apparatus is fed, which gas heats the ore externally and may also pass through or over the ore, afterwards mixing with the gaseous atmosphere in this part of the chamber. Figure 14 shows, for example, a series of passages 86 in the lining of the chamber 1. The interior surface of the lining may be built up over each such passage, as shown at 87 forming a series of lands and the valleys between them may be built up flush with the lands in places as for example at 87'. In the case where the chamber 1 is provided with passages in its lining as just described gas may be admitted to and/or withdrawn from these passages by means situated at 88 and 89 (see Figure 1b) similar to those hereinafter described in reference to the admission of gases to and their withdrawal from the reduction chamber 2. The gases finally leaving the revolving chamber 1, and consisting mainly of a comparatively low percentage of carbon-monoxide and a comparatively high percentage of carbon-dioxide, may now pass to a portion of the apparatus, indicated diagrammatically at 90 (Figures 1a and 1b), in which they are prepared for further use in the reducing chamber either by heating them alone, or preferably by passing them through or heating them in contact with coke or other carbonaceous material, thereby assisting the rise in their temperature and the conversion of their carbon-dioxide content into carbon-monoxide.

Used gas may be revived by passing it through coke or other fuel heated to the requisite temperature. In that case, the chamber 90 (Figures 1a and 1b) would represent diagrammatically a reviving apparatus instead of a recuperator.

A portion of the gases which leave the ore preheating chamber 1 may be employed, usually without reviving or recuperating them, to preheat any of the raw materials or part of the apparatus. For example, in this way the coal may be dried and preheated and the ore may be dried and/or calcined.

Figures 9, 11, 12, 13:
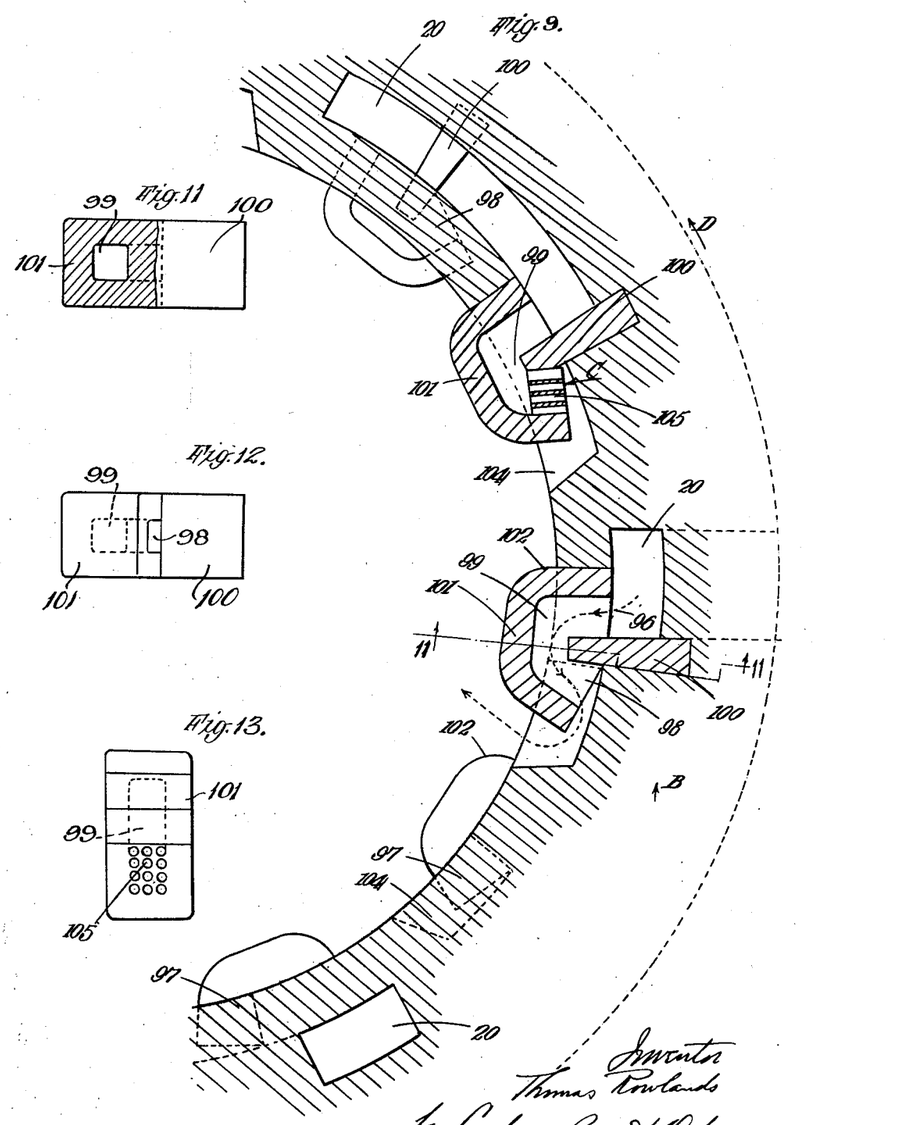
Figure 10:
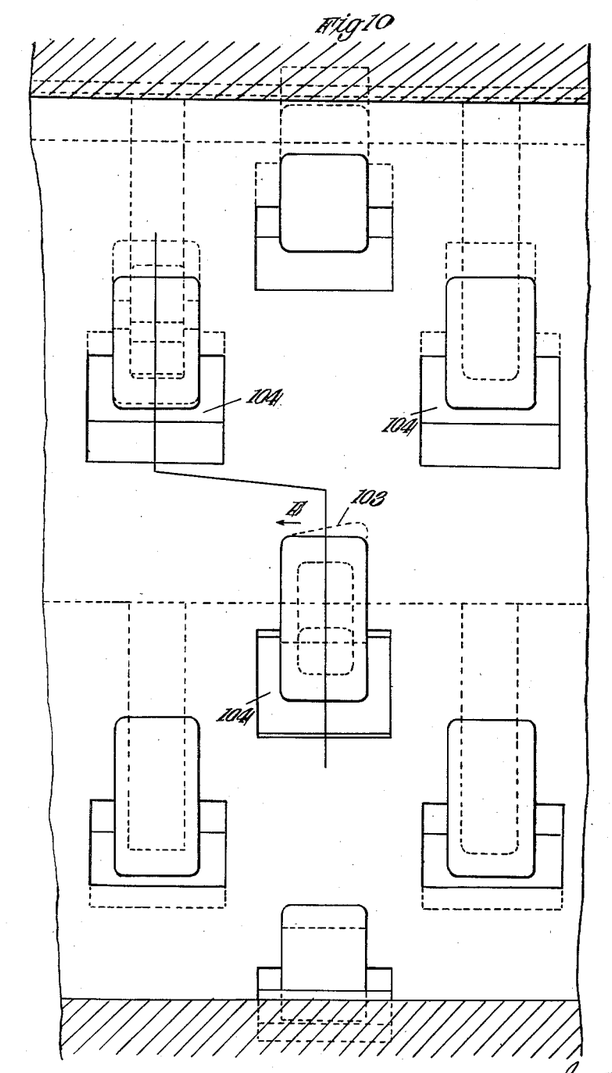
Figure 10 is a sectional plan on the line 10—10 of Figures 1a and 1b.

In the ore preheating section 1 and/or the reduction section 2 the gas may be introduced by the following means (see Figures 1a, 1b, 4 and 9 to 13). The preheated gas is brought by a main 91 (or 92) to a non-rotating section 93, in contact with which the rotating chamber turns. A gas belt, or channel, or port, or the like 94, is formed in the fixed section 93. A part of the rotating chamber covers one side of the said channel 94. Ports or passages 95 are formed in the rotating part, said passages receiving gas from said channel 94 when they turn into position contiguous to same. Such ports conduct the gas to passages 20 formed in the wall of the rotating chamber. These passages are provided with a series of outlet members 97 from which the gas passes into and through the charge and to the atmosphere within the chamber. Figure 9 shows one form of the said outlet members 97 and the passages leading to them, the dotted line 96 indicating the direction of flow of the gases from the passages 20 to the exit 98 leading to the interior of the chamber. The outlet member 97 which may be moulded integrally or formed by an assembly of several component pieces of refractory clay, metal or other material, has an opening 98 and a passage 99 forming a continuation of the passage 20. The passage 99 passes round a baffle part 100, and the gas exit 98 is formed under the domed part 101. the direction of rotation of the chamber is indicated by the arrow D. The charge tends to fall away from the exit 98 and thus not to choke same. The leading part 102 may be of inclined, or bow, or plough shape.

The leading part may be inclined as shown at 103 (Figure 10) so as to tend to propel the charge in the desired direction along the chamber as indicated by the arrow E.

The exit 98 may be formed at a level below the inner surface of the vessel, being in a well or countersink 104.

The exit 98 may also be subdivided into a number of passages, as shown for example at 105 (Figures 9 and 13).

Figure 8:
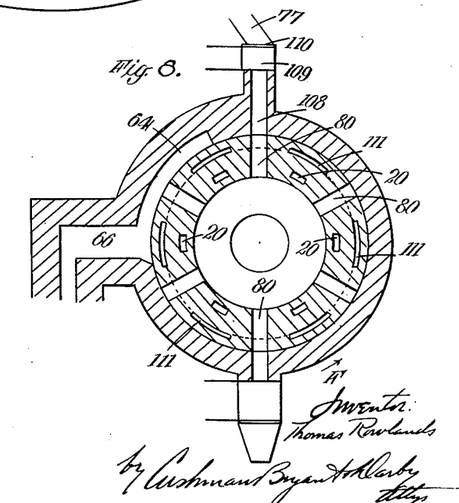
Figure 8 is a section on the line 8—8 of Figure 1b.

In Figure 8 means are shown by which solids or gases may be introduced to or withdrawn from one of the rotating chambers. A joint between a part or parts comprising a non-rotating section and the rotating chamber has a general resemblance to the joint previously described by which gases are introduced. Solids may be introduced through the upper part at 108. The solids which have been conveyed to the conduit 77 by means already described in reference to Figure 1a are received and remain in a valve chamber 109 which may act as measuring container for passing a desired quantity of coke which falls into it on each occasion of opening the upper valve. The lower valve is opened when a passage 80 in the rotating part registers with the exit end of the conduit 108, this being the position represented in Figure 8.

When the valve is opened the coke or other solid falls out of the valve through the passage 80 into the rotating chamber. solids may be withdrawn from a chamber by an arrangement similar to that described above for feeding them into the chamber, at the lower part of a non-rotating section.

Gases may be withdrawn from or introduced to the chamber by the channel or port shown at 64 (Figure 8) which leads to a flue or culvert 66. The direction of rotation is indicated by the arrow F.

The sections of the rotating chamber to which reference has been made may be separately constructed and built together for ease of access, and the designs of the different parts may differ from one another. In Figures 1a and 1b one such arrangement is shown. This shows an arrangement in which the series of chambers may rotate together upon a common axis, the charge being conveyed as required from section to section.

The present process enables the presence of air in the interior of the apparatus to be dispensed with, whereby the volume of inert gas requiring to be heated is reduced to a minimum.

In the foregoing where reference has been made to the reduction of iron ore it is to be understood that a similar procedure is applicable to the treatment of iron or steel scale, rust, swarf, or other products rich in iron or of the character of iron-oxide-rich material.

When the process and apparatus in accordance with the present invention is used for operating upon raw materials other than iron ore, iron or steel scale, and the like, modifications are made in certain parts of the procedure and in the form of certain parts of the apparatus. In the case for example of the reduction of copper from copper oxide, the proportion of hydrogen or hydrogen compounds supplied to the reducing section may be increased and the temperature in such section may be reduced. Means may be provided for the removal of water vapour from the gases after they have performed the reduction, one such means consisting in treating them in a coke or carbon container at such a temperature and in such a way as to reform carbon-monoxide and hydrogen in the gases before they are returned for use in the rotating chamber.

Throughout the appended claims it is to be understood that the expression "ores" is used as indicating both ores strictly so termed and also other metallic products that can be suitably treated for the production of metal therefrom by the process according to the present invention.

What I claim and desire to secure by Letters Patent of the United States is:—

1. A process for the direct production of metal from ores without melting them which consists in passing the ore successively through preheating, reduction and cooling zones of a rotary furnace, subjecting carbonaceous fuel to a low temperature carbonization in the cooling zone by means of sensible heat of the treated charge that has passed through the reduction zone and without any direct contact taking place in the said cooling zone between said fuel and treated charge, and effecting the reduction of the ore in the reduction zone at a comparatively low temperature and considerably below melting temperatures by means of the reducing gases and solid fuel obtained from the low temperature carbonization treatment of the fuel.

2. A process for the direct production of metal from ores without melting them which consists in passing the ore successively through preheating, reduction and cooling zones of a rotary furnace, subjecting carbonaceous fuel to a low temperature carbonization in the cooling zone by means of sensible heat of the treated charge that has passed through the reduction zone and without any direct contact taking place in the said cooling zone between said fuel and treated charge, effecting the reduction of the ore in the reduction zone at a comparatively low temperature and considerably below melting temperatures by means of the reducing gases and solid fuel obtained from the low temperature carbonization treatment of the fuel, and converting a large proportion at least of the carbon dioxide produced as a result of the reduction reaction into carbon monoxide for re-use in the process.

3. A process as in claim 1, in which the gaseous products obtained from the low temperature carbonization treatment of the fuel are treated for the recovery of valuable by-products before utilizing them in the reduction of the ore.

4. A process as in claim 1 applied to the reduction of iron ore to iron granules, in which the reduction of the iron from its ore is effected at a comparatively low temperature within a range of about 500° C. to 950° C.

5. A process as in claim 2 applied to the reduction of iron ore to iron granules, in which the reduction of the iron from its ore is effected at a comparatively low temperature within a range of about 500° C. to 950° C.

6. A process as in claim 1 applied to the reduction of iron ore to iron granules, in which the reduction of the iron from its ore is effected at a temperature of about 500° C. to 950° C. by bringing into contact with the said ore partially degasified coal, gaseous products resulting from the low temperature carbonization treatment of the coal, and gases in which carbon monoxide has been reformed.

7. A process as in claim 2 applied to the reduction of iron ore to iron granules, in which the reduction of the iron from its ore is effected at a temperature of about 500° C. to 950° C. by bringing into contact with the said ore partially degasified coal, gaseous products resulting from the low temperature carbonization treatment of the coal, and gases in which carbon monoxide has been reformed.

8. A process for the direct production of metal from ores without melting them which consists in passing the ore successively through preheating, reduction and cooling zones of a rotary furnace, subjecting carbonaceous fuel to a low temperature carbonization in a retort located in the cooling zone by means of sensible heat of the treated charge that has passed through the reduction zone and without any direct contact taking place in the said cooling zone between said fuel and treated charge, and effecting the reduction of the ore in the reduction zone at a comparatively low temperature and considerably below melting temperatures by means of the reducing gases and solid fuel obtained from the low temperature carbonization treatment of the fuel, said reducing gases flowing over and through the mass of the charge in the reduction zone in a direction opposite to that in which the charge moves through said reduction zone.

9. A process as in claim 1, in which the heating of the ore in the preheating zone is effected by hot gases after their passage through the reduction zone.

10. A process as in claim 2, in which the heating of the ore in the preheating zone is effected by hot gases after their passage through the reduction zone.

11. A process as in claim 8, in which the heating of the ore in the preheating zone is effected by hot gases after their passage through the reduction zone.

12. A process as in claim 1, in which the heating of the ore in the preheating zone is effected by hot gases after their passage through the reduction zone and in which the gases leaving the ore preheating zone and containing a comparatively low percentage of carbon monoxide and a comparatively high percentage of carbon dioxide are subjected to a treatment for raising their temperature and converting a considerable proportion at least of their carbon dioxide content into carbon monoxide.

13. A process as in claim 1, in which the heating of the ore in the preheating zone is effected by hot gases after their passage through the reduction zone and in which the gases leaving the ore preheating zone and containing a comparatively low percentage of carbon monoxide and a comparatively high percentage of carbon dioxide are subjected to a treatment for raising their temperature and converting a considerable proportion at least of their carbon dioxide content into carbon monoxide by passing them through a mass of hot coke.

14. A process for the direct production of metal from ores without melting them which consists in passing the ore successively through preheating, reduction and cooling zones of a rotary furnace, subjecting carbonaceous fuel to a low temperature carbonization in a retort located in the cooling zone by means of sensible heat of the treated charge that has passed through the reduction zone and without any direct contact taking place in the said cooling zone between said fuel and treated charge, effecting the reduction of the ore in the reduction zone at a comparatively low temperature and considerably below melting temperatures by means of the reducing gases and solid fuel obtained from the low temperature carbonization treatment of the fuel, and conducting gases from other stages of the process into the fuel retort in the cooling zone for the regulation of the temperature therein.

15. A process as in claim 14, in which a large proportion at least of the carbon dioxide produced as a result of the reduction reaction is converted into carbon monoxide for reuse in the process.

16. A process as in claim 14 applied to the reduction of iron ore to iron granules, in which the reduction of the iron from its ore is effected at a comparatively low temperature within a range of about 500° C. to 950° C.

17. A process as in claim 14 applied to the reduction of iron ore to iron granules, in which the reduction of the iron from its ore is effected at a temperature of about 500° C. to 950° C. by bringing into contact with the said ore partially degasified coal, gaseous products resulting from the low temperature carbonization treatment of the coal, and gases in which carbon monoxide has been reformed.

THOMAS ROWLANDS.